United States Patent
Chen et al.

(10) Patent No.: US 10,816,005 B2
(45) Date of Patent: *Oct. 27, 2020

(54) FAN AND CONTROL METHOD THEREOF

(71) Applicant: COOLER MASTER TECHNOLOGY INC., New Taipei (TW)

(72) Inventors: Chung-Yang Chen, New Taipei (TW); Chia-Hao Sung, New Taipei (TW)

(73) Assignee: COOLER MASTER TECHNOLOGY INC.

( * ) Notice: Subject to any disclaimer, the term of this patent is extended or adjusted under 35 U.S.C. 154(b) by 0 days.

This patent is subject to a terminal disclaimer.

(21) Appl. No.: 16/441,267

(22) Filed: Jun. 14, 2019

(65) Prior Publication Data
US 2019/0293078 A1 Sep. 26, 2019

Related U.S. Application Data

(63) Continuation of application No. 15/394,410, filed on Dec. 29, 2016, now Pat. No. 10,364,817.

(51) Int. Cl.
| | |
|---|---|
| *F21V 33/00* | (2006.01) |
| *F04D 27/00* | (2006.01) |
| *F04D 25/08* | (2006.01) |
| *F04D 25/06* | (2006.01) |
| *F04D 29/32* | (2006.01) |
| *F04D 29/52* | (2006.01) |
| *H05B 45/20* | (2020.01) |
| *H05B 47/105* | (2020.01) |
| *F21Y 113/13* | (2016.01) |
| *F21Y 115/10* | (2016.01) |

(52) U.S. Cl.
CPC ............ *F04D 27/004* (2013.01); *F04D 25/06* (2013.01); *F04D 25/08* (2013.01); *F04D 27/007* (2013.01); *F04D 29/325* (2013.01); *F04D 29/522* (2013.01); *F21V 33/0052* (2013.01); *F21V 33/0096* (2013.01); *H05B 45/20* (2020.01); *H05B 47/105* (2020.01); *F21Y 2113/13* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 4,500,821 | A | 2/1985 | Bitting et al. |
| 5,738,496 | A | 4/1998 | Mehta |
| | | (Continued) | |

FOREIGN PATENT DOCUMENTS

| | | |
|---|---|---|
| CN | 201165989 Y | 12/2008 |
| CN | 202914337 U | 5/2013 |
| | (Continued) | |

*Primary Examiner* — Paul B Yanchus, III
(74) *Attorney, Agent, or Firm* — McDermott Will & Emery LLP

(57) ABSTRACT

A fan includes a motor, a plurality of fan blades coupled to the motor and rotatable by the motor, a light source positioned to be independent from rotation of the plurality of fan blades, and a processor controlling the first light source to turn on/off with a frequency determined at least based on a relation with respect to a rotational speed of the plurality of fan blades. Thereby, a visually static view or a slowly rotating view of the fan blades is displayed while the fan blades are operating.

18 Claims, 17 Drawing Sheets

(56) References Cited

U.S. PATENT DOCUMENTS

| | | | |
|---|---|---|---|
| 6,120,262 A | 9/2000 | McDonough et al. | |
| 6,213,617 B1 | 4/2001 | Barker | |
| 7,183,939 B1 | 2/2007 | Lo et al. | |
| 10,364,817 B2 * | 7/2019 | Chen | H05B 47/105 |
| 2003/0049124 A1 | 3/2003 | Liu | |
| 2006/0133920 A1 | 6/2006 | Chen | |
| 2009/0122572 A1 | 5/2009 | Page et al. | |
| 2018/0163960 A1 | 6/2018 | Lin | |

FOREIGN PATENT DOCUMENTS

| | | |
|---|---|---|
| CN | 103133372 A | 6/2013 |
| TW | M522274 U | 5/2016 |

* cited by examiner

FAN AND CONTROL METHOD THEREOF

CROSS-REFERENCE TO RELATED APPLICATIONS

This non-provisional application is a continuation application of and claims priority under 35 U.S.C. § 120 to U.S. application Ser. No. 15/394,410 filed Dec. 29, 2016, the entire contents of which are hereby incorporated by reference.

TECHNICAL FIELD

The present disclosure is related to a fan and a control method thereof, and more particularly, to a fan providing a visually static view of fan blades or a visually slowly rotating view of the fan blades while the fan blades are rotating at a high speed in real time and a control method thereof.

BACKGROUND

With development of computer technology, high power electronics are integrated into computers. Heat generated by the high power electronics increases, requiring fans integrated to the computers so as to efficiently dissipate the generated heat.

Users of computers usually spend a long time at a task, and thus can become fatigued. As such, there is a demand in the computer industry for computer hardware not only to perform conventional functions but also entertain the users and hence provide a relaxed environment for them.

SUMMARY

Various aspects of the present disclosure provide a fan able to provide a virtually static view of fan blades or a virtually slowly rotating view of the fan blades while the fan blades are rotating at a high speed in real time, which may attract attention and entertain a user and thus provide a relaxed environment to the user.

According to one aspect of the present disclosure, a fan includes a motor, a plurality of fan blades coupled to the motor and rotatable by the motor, a first light source positioned to be independent from rotation of the plurality of fan blades, and a processor controlling the first light source to turn on/off at a first frequency determined at least based on a relation with respect to a rotational speed of the plurality of fan blades.

According to another aspect of the present disclosure, a method for controlling a fan includes determining a rotational speed of a plurality of fan blades, determining, at least based on the rotational speed, a first frequency at which to turn on/off a first light source, driving the plurality of fan blades to rotate at the rotational speed without rotating the first light source, and controlling the first light source to turn on/off in accordance with the determined first frequency.

According to another aspect of the present disclosure, a fan includes a motor, a plurality of fan blades coupled to the motor, a motor driver driving the motor so as to propel the plurality of fan blades to rotate at a rotational speed, a frame, a plurality of light sources mounted on a circuit board fixed to the frame, and a plurality of light sources spaced-apart from the plurality of fan blades, and a processor receiving a signal indicative of the rotational speed from the motor driver and controlling at least one of the plurality of light sources to turn on/off at a frequency determined at least based on a relation with respect to the rotational speed of the plurality of fan blades.

DETAILED DESCRIPTION

Figure 1A:
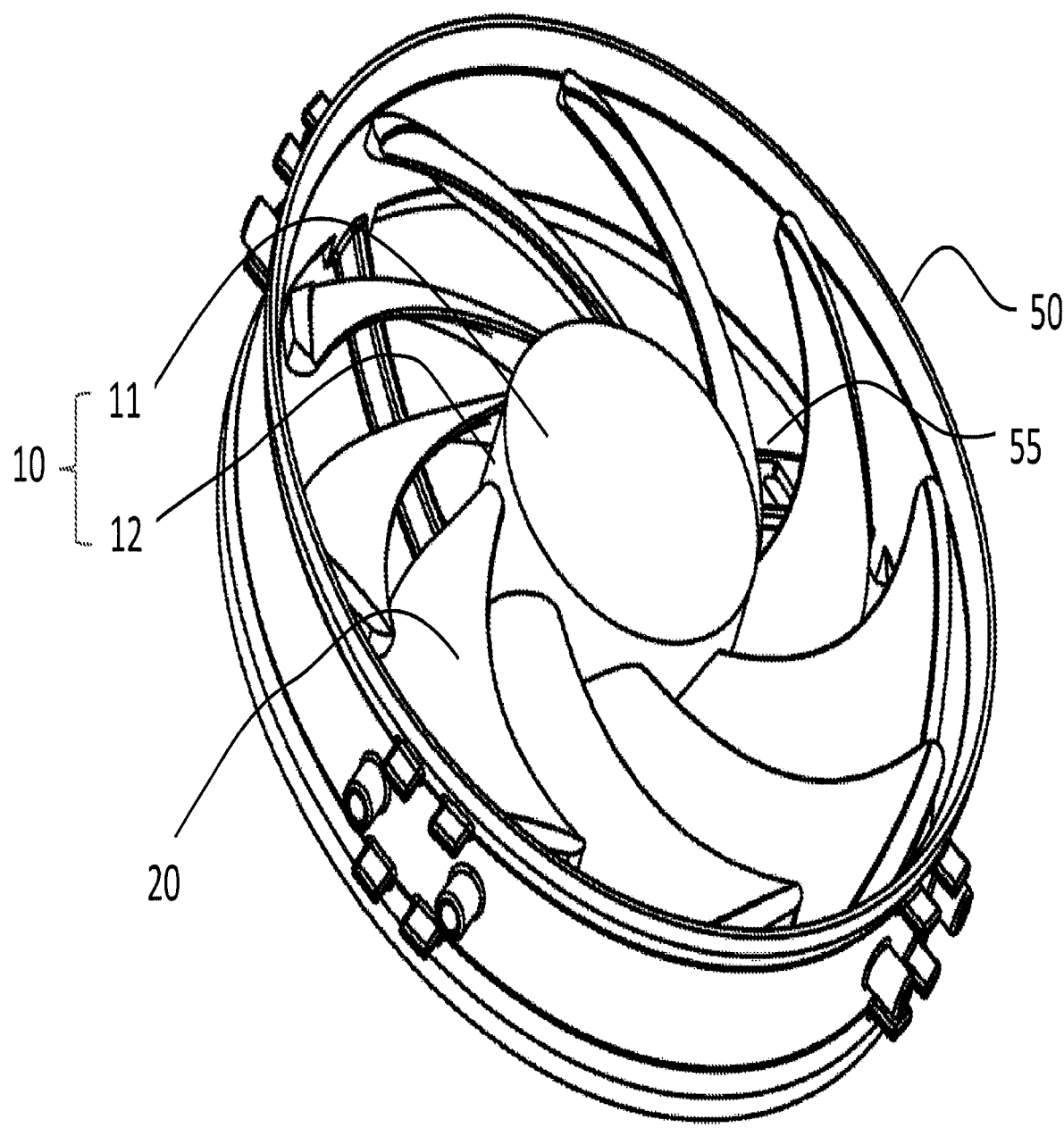
FIG. 1A is schematic oblique view of a fan according to embodiments of the present disclosure.

A fan according to various embodiments of the present disclosure to be described below may be used in a computer to cool an electronic component therein, although the present disclosure is not limited thereto. The fan according to various embodiments of the present disclosure may be used to circulate air in other equipment or in a room.

In the entire disclosure, the same reference character represents the same element/step. In some embodiments, the descriptions of the element represented by the same reference character may be omitted to avoid redundancy and can be referred to the descriptions in other embodiments.

The various embodiments of the present disclosure can be combined and/or modified based on each other, unless the embodiments identified in the present disclosure are incompatible or conflict with each other.

Figure 1B:
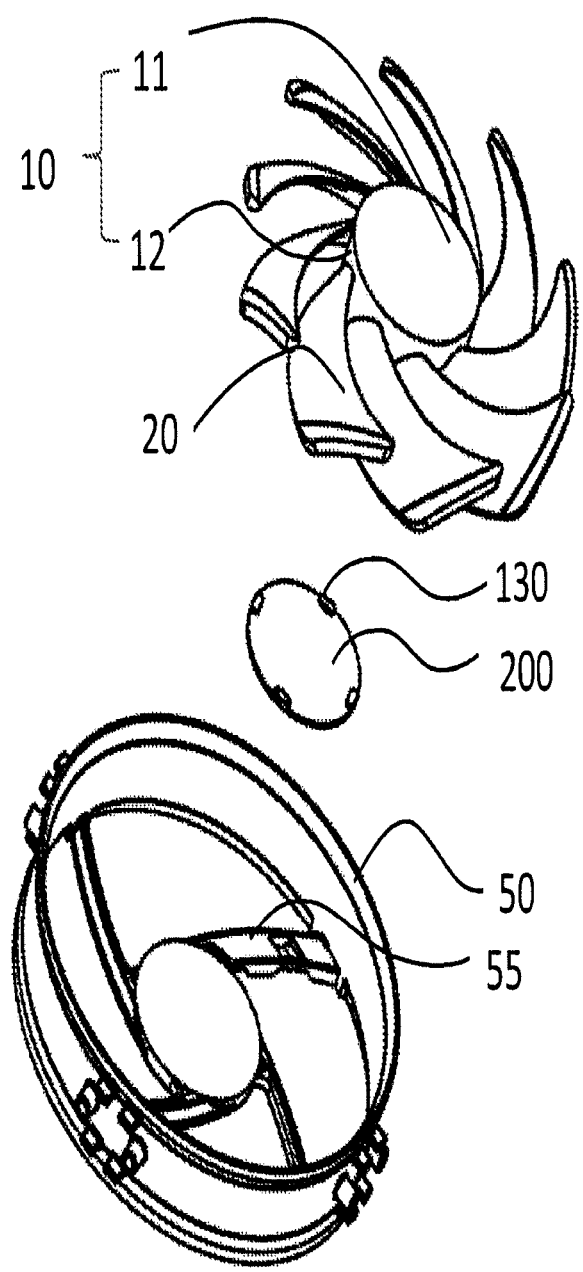
FIG. 1B is disassembled oblique view of the fan shown in FIG. 1A.
Figure 1C:
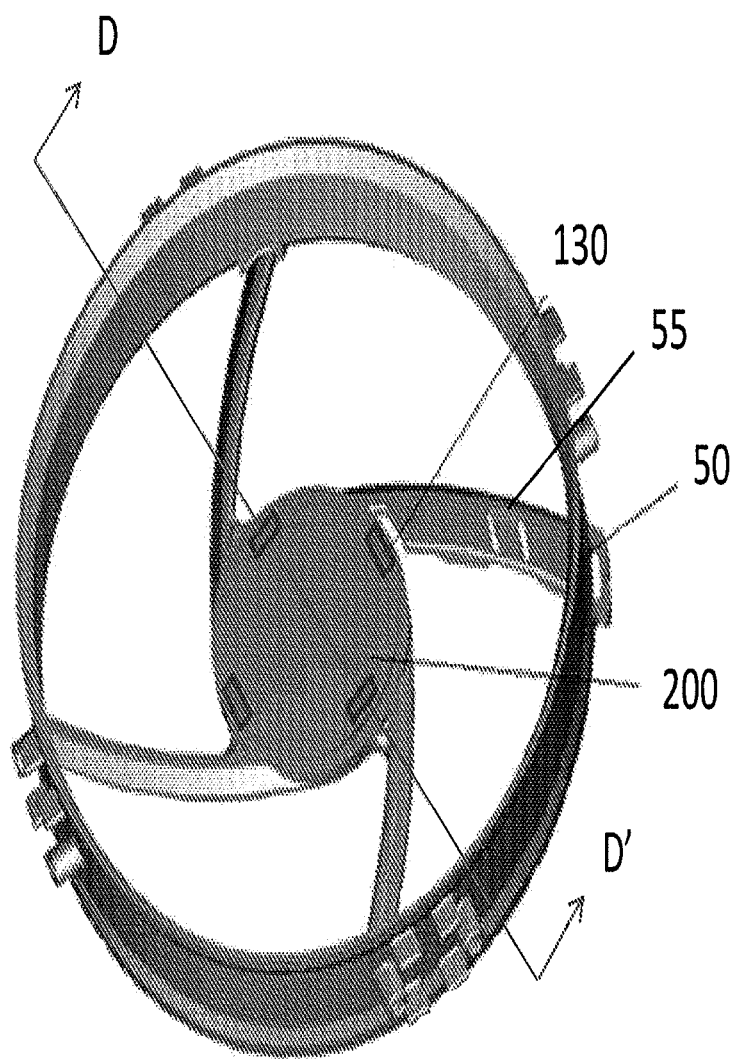
FIG. 1C is a schematic oblique view of a supporting structure of the fan shown in FIG. 1A.
Figure 1D:
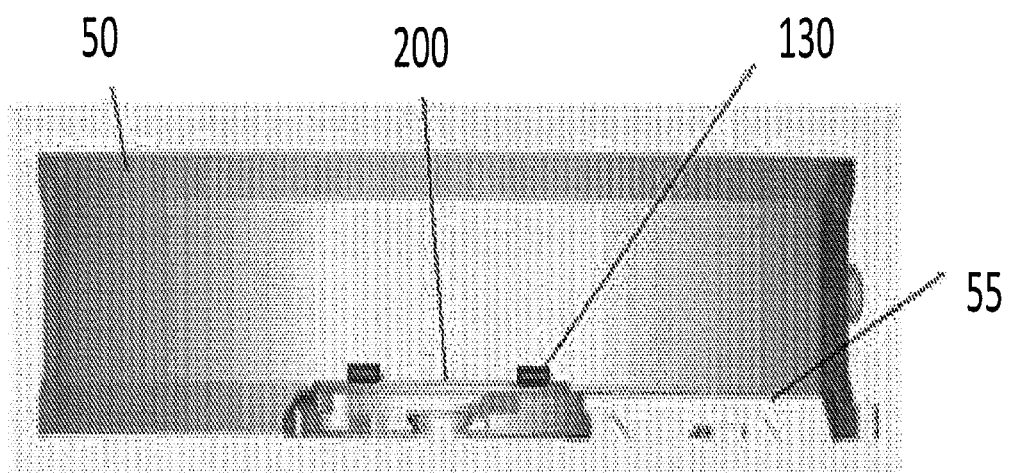
FIG. 1D is a projection view of the supporting structure along line D-D' shown in FIG. 1C.
Figure 2:
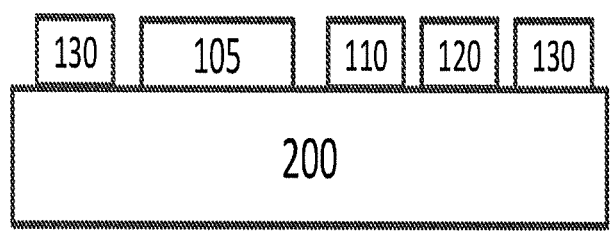
FIG. 2 shows a circuit board of a fan according to embodiments of the present disclosure.

FIG. 1A is schematic oblique view of a fan according to embodiments of the present disclosure, FIG. 1B is disassembled oblique view of the fan shown in FIG. 1A, FIG. 1C is a schematic oblique view of a supporting structure of the fan shown in FIG. 1A, FIG. 1D is a projection view of the supporting structure along line D-D' shown in FIG. 1C, and FIG. 2 shows schematic view of a circuit board shown in FIGS. 1B-1D.

As shown in FIGS. 1A-2, a fan substantially includes a hub 10, a plurality of fan blades 20 mechanically coupled to the hub 10, a circuit board 200, and a frame 50 supporting the circuit board 200 and the hub 10.

The hub 10 may have a circular upper plate 11 and an annular shrouding plate 12 downwardly directed and extending from an edge of the upper plate 11.

The plurality of fan blades 20 radially extend away from the peripheral surface of the shrouding plate 12. Each fan blade 20 is substantially of a three dimensional arched shape, which has an upper arc surface and a lower arc surface correspondingly formed under the upper arc surface. As way of example, the number of the plurality of fan blades 20 is 9 as shown in FIGS. 1A and 1B; the present discourse, however, is not limited thereto. In some embodiments, the number of the plurality of fan blades may be greater or fewer than 9, for example, from 3 to 8 or from 10 to 50.

Each fan blade 20 may either directly extend from the edge of the hub 10 or link to the peripheral surface of the hub 10 via a connecting method and extending away from the hub 10. Thus, when the hub 10 rotates around a shaft (not shown) located at a center thereof, the plurality of fan blades 20 synchronously rotate around the shaft. The shaft may be a portion of the hub 10 or a portion of a motor 140 which will be described later with reference to FIGS. 3, 7, 9, 11, and 13. The motor 140 may be disposed in an inner space confined by the upper plate 11 and the shrouding plate 12. The mechanical coupling between the plurality of fan blades 20 and the motor 140 can be configured in other different ways. For example, the plurality of fan blades 20 may be directly coupled to a motor without being coupled to the shrouding plate 12 of the hub 10. One of ordinary skill in the art would appreciate that various other modifications can also be made, as long as the plurality of fan blades 20 can be propelled to rotate under the control of the motor 140.

The circuit board 200, which may be a printed circuit board or a flexible circuit board, can have a circular shape corresponding to a shape of the circular upper plate 11. According to embodiments of the present disclosure, the circuit board 200 may accommodate, but is not limited to, a power supply 105 for providing a DC source, which may be a power conversion circuit such as an AC-DC converter or a DC-DC converter, a connection circuit for receiving power form an external power source (not shown) and transmitting the received power for on-board use, or a battery. In addition, a motor driver 110 configured to drive a motor 140 to be described later and a processor 120 configured to control a plurality of light sources 130 are also disposed on the circuit board 200. The circuit board 200 not only supports various electronic components disposed thereon but also includes various conductive patterns for transmitting signals among the various electronic components. In one embodiment, the motor driver 110 may be integrated into the processor 120. A plurality of light sources 130 are disposed on the circuit board 200 and accommodated in a space confined by the upper plate 11, the shrouding plate 12, and the circuit board 200. The circuit board 200 is affixed to the frame 50 through a supporting structure 55, and is stationary with respect to rotation of the plurality of fan blades 20. That is, the light sources 130 are unmovable and independent from the rotation of the plurality of fan blades 20. In some embodiments, the circuit board 200 is fixed by snapping into an inner structure provided by the supporting structure 55.

Although FIG. 2 shows that the various elements including the power supply 105, the motor driver 110, the processor 120, the motor 140, and the plurality of light sources 130 are disposed on a same surface of the circuit board 200, the present disclosure is not limited thereto. In some other embodiments, the various elements can be disposed on opposite surfaces of the circuit board 200 for integration. In one embodiment, the fan may include two or more circuit boards for accommodating the aforementioned various elements.

The plurality of light sources 130 may include at least one light source emitting red light, at least one light source emitting green light, and/or at least one light source emitting blue light. Alternatively or optionally, the plurality of light sources 130 may include light sources emitting other colors other than red, green, and blue. For example, the plurality of light sources 130 may include white color and/or yellow color light sources. The light sources may be configured to be light emitting diodes (LEDs), although the present disclosure is not limited thereto. Although the fan shown in FIGS. 1A-2 according embodiments of the present disclosure includes the plurality of light sources 130, in other embodiments, one and only one light source 130 may be included.

In some embodiments, the hub 10 may be of a semitransparent material or a translucent material for diffusing light, such that light emitted by the plurality of light sources 130 may be diffused by the hub 10. Thus, the user may feel more comfortable since the diffused light by the upper plate 11 rather than the light directly emitted by the plurality of light sources 130 is incident into eyes of the user when the user views the fan and the diffused light by the shrouding plate 12 can illuminate the plurality of fan blades 20. In this case, the color of the plurality of fan blades 20 being displayed or visible to the user may be the same color of the light emitted by the plurality of light sources 130. In other embodiments, the shrouding plate 12 may be formed of a transparent, semitransparent, or translucent material, or may be configured to have a plurality of openings, such that the light emitted by the plurality of light sources 130 can pass through to illuminate the plurality of fan blades 20, and the upper plate 11 may be formed of a light blocking material such that no light would pass through the upper plate 11. In this case, the plurality of fan blades 20 can still be illuminated by the plurality of light sources 130 while the upper plate 11 will not be illuminated such that the user may feel more comfortable when looking at the fan.

As an example shown in FIGS. 1A-2, the plurality of light sources 130 are disposed on the circuit board 200. The present disclosure is not limited thereto. The plurality of light sources 130 may be disposed at other locations, as long as the plurality of light sources 130 are fixed, will not rotate when the plurality of fan blades 20 rotate, and can illuminate the plurality of fan blades 20. As described above, the plurality of light sources 130 are fixed and are configured not to rotate along with the plurality of fan blades 20. That is, when the plurality of fan blades 20 rotate, the plurality of fan blades 20 move with respect to the plurality of light sources 130 which remain in a fixed location with respect to the other non-moveable elements of the fan such as, but not limited to, the frame 50 and the supporting structure 55. In this case, the plurality of light sources 130 are independent from the rotation of the plurality of fan blades 20. In some other embodiments, the plurality of light sources 130 may be evenly distributed along a peripheral portion, such as the frame 50 surrounding the plurality of fan blades 20, or even on the supporting structure 55, as long as at those locations, the plurality of light sources 130 are fixed and not rotatable and can provide illumination to the plurality of fan blades 20.

Figure 3:
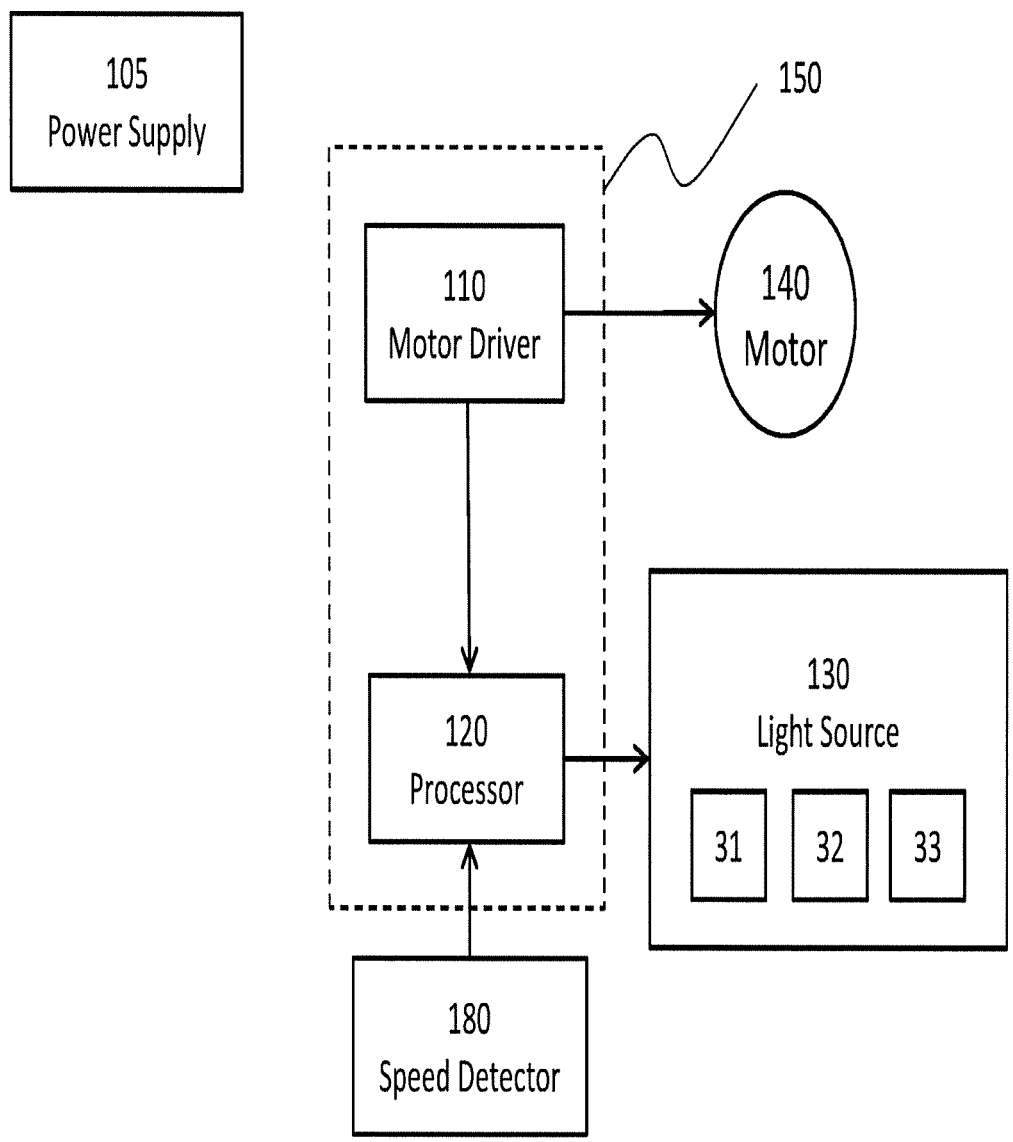
FIG. 3 shows a schematic circuit diagram of a fan according to embodiments of the present disclosure.

FIG. 3 shows a schematic circuit diagram of a fan according to embodiments of the present disclosure. FIGS. 4A-5B are photos respectively illustrating modes of operation of the fan according to embodiments of the present disclosure.

Referring to FIG. 3, a power supply 105, a motor driver 110, a motor 140, a processor 120, and a plurality of light sources 130 are depicted in a schematic circuit diagram of a fan according to embodiments of the present disclosure.

The power supply 105 may be a power conversion circuit such as an AC-DC converter or a DC-DC converter, a connection circuit for receiving power from an external power source (not shown), or a battery. The power supply 105 directly or indirectly supplies power to various electronic components of the fan that require power, including, but not limited to, the motor driver 110, the motor 140, the processor 120, and the plurality of light sources 130 depicted in FIG. 3.

The motor driver 110 provides a control signal such as a pulse width modulation (PWM) signal to control a rotational speed of the motor 140 which is mechanically coupled to a plurality of fan blades 20 (shown in FIGS. 1A and 1B) of the fan through, for example, a shaft 13 (shown in FIG. 1B). The motor driver 110 transmits to the processor 120 a signal indicative of the rotational speed of the motor 140. The motor driver 110 may be configured to be an analog circuit, or a digital circuit, or a combination thereof, and may be implemented, for example, by a microprocessor, an application-specific integrated circuit (ASIC), or a field-programmable gate array (FPGA).

The processor 120 receives the signal indicative of the rotational speed of the motor 140 from the motor driver 110, generates a control signal indicative of an on/off frequency of at least one of the plurality of light sources 130 based at least on the received rotational speed of the motor 140, and transmit the control signal to the at least one of the plurality of light sources 130. The received rotational speed from the motor driver 110 may have a unit of revolutions per minute (rpm). If not, the processor 120 can convert the unit of the received rotational speed to rpm.

In one embodiment, the processor 120 is configured to generate the control signal indicative of the on/off frequency of at least one of the plurality of light sources 130 based on Equation (1).

$$f = R/60 * N * C \qquad (1)$$

in which, f is the on/off frequency of at least one of the plurality of light sources 130, R is the received rotational speed of the motor c in rpms, N is the number of the plurality of fan blades 20, and C is a constant which can be a natural number in some embodiments.

One or more light sources of the plurality of light sources 130, under control of the control signal indicative of the on/off frequency provided by the processor 120, are simultaneously turned on and/off at the on/off frequency. In some embodiments, the control signal indicative of the on/off frequency provided by the processor is applied to a pulse width modulation (PWM) circuit to modulate the on/off frequency of the one or more light sources of the plurality of light sources 130. In a case in which the plurality of fan blades 20 rotate at the rotational speed and are illuminated by the one or more light sources of the plurality of light sources 30, which are turned on/off at the frequency determined by the processor 120 based, for example, on Equation (1) with a default value of C or a value of C determined by the user (user determination of the value of C will be described later), each of the plurality of fan blades 20 although rotating at a high speed in real time but can display, for example, a static appearance in which each fan blade exhibits no visual movement.

In one embodiment, the plurality of light sources 130 may include red, green, and blue color light sources 31, 32, and 33. Alternatively or optionally, the plurality of light sources 130 may include other light sources emitting other colors other than red, green, and blue. For example, the plurality of light sources 130 may include white color and/or yellow color light sources. The light sources may be configured as light emitting diodes (LEDs), although the present disclosure is not limited thereto. In another embodiment, one and only one light source 130 rather than a plurality of light sources may be implemented.

In one embodiment, each of the plurality of light sources 130 is controlled to turn on/off by the same control signal provided by the processor 120.

In another embodiment, a first group of light sources of the plurality of light sources 130, of which the on/off frequency is controlled by a first control signal indicative of a first on/off frequency provided by the processor 120, and a second group of light sources of the plurality of light sources 130 emitting a second different color, of which the on/off frequency is controlled by a second control signal indicative of a second different on/off frequency provided by the processor 120. In some embodiments, the same group of light sources emit light having the same color, although the present disclosure is not limited thereto. The first and second on/off frequencies can both be determined by Equation (1), but with different values of C applied to Equation (1). In a certain embodiment, only those light sources controlled by the control signal provided the processor 120 are turned on/off at the determined frequency in one period which is long enough, for example, 0.5 second or longer, and in such one period, all the other light sources are maintained off.

Alternatively and/or optionally, the fan may include a speed detector 180, which may include a light source and an optical sensor, for detecting the rotational speed of the plurality of fan blades 20. In this case, the speed detector 180 can transmit a signal indicative of the detected rotational speed of the plurality of fan blades 20 to the processor 120 and/or the motor driver 110. The processor 120 and/or the motor driver 110 can realize more accurate control of the plurality of light sources 130 and the motor 140, based on the detected real time rotational speed provided by the speed detector 180.

Figure 4A:
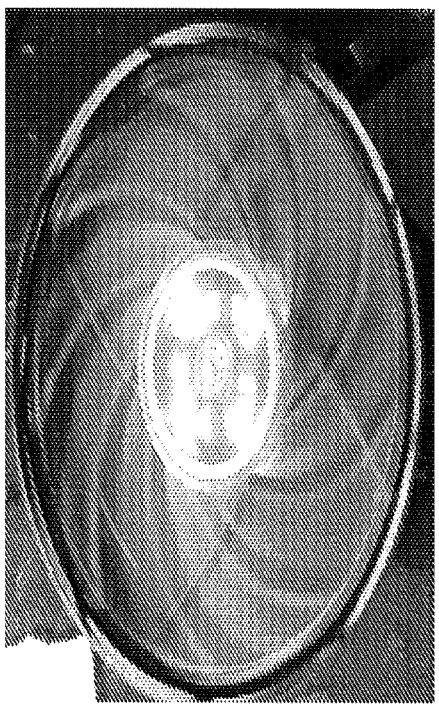
FIGS. 4A-5B are photos respectively illustrating modes of operation of the fan according to embodiments of the present disclosure.

As a non-restrictive example shown in FIG. 4A, in a case in which C is 1, N is 9, R is 1470 rpms, and the light sources are turned on/off at a frequency f determined to be 220.5 Hz based on Equation (1), the user can observe a visually static view of 9 fan blades of the fan even though all the fan blades rotate at a speed of 1470 rpms. The user thus may be attracted and/or entertained so that the user may have less stress when viewing the fan which will display visually static fan blades.

In a case in which the light sources are turned on/off at the determined frequency f emitting one color for one period and the light sources are turned on/off at the determined frequency f emitting another different color for another period thereafter, the user can observe 9 virtually static fan blades in the one color and the other color periodically. The one and the other periods are each long enough for a user's observation which, for example, is 0.5 second and are short enough to be within a glance period of the user which, for example, is 5 seconds.

Figure 4B:

Another non-restrictive example is shown in FIG. 4B having the condition the same as that of the fan shown in FIG. 4A, except that C is selected to be 2 and the on/off frequency f thus is determined to be 441 Hz, two times the on/off frequency used in FIG. 4A.

As shown in FIG. 4B, the user can observe a virtually static view of 18 fan blades, two times the total 9 fan blades of the fan, even though all the 9 fan blades rotate at a speed of 1470 rpms. The example shown in FIG. 4B gives the user another entertaining view of the blades.

In a case in which the two modes shown in FIGS. 4A and 4B alternate one after another, the user may periodically observe 9 fan blades and 18 fan blades. One of ordinary skill in the art would appreciate that when the light sources shown in FIG. 4B emitting light having a different color from the color of the light sources shown in FIG. 4A, the user may periodically observe visually static 9 fan blades in one color and visually static 18 fan blades in another different color.

It should be appreciated that in a case in which C is selected to be other natural numbers such as 3, 4, . . . , etc., a visually static view of three times, four times, . . . etc., the total 9 fan blades of the fan will be observed by the user.

In addition to generate the control signal indicative of the on/off frequency of at least one of the plurality of light sources 130 based on Equation (1), the processor 120 is configured to generate the control signal indicative of the on/off frequency of at least one of the plurality of light sources 130 based on one of the following Relation (2) and Relation (3) in other embodiments.

$$f > R/60*N*C \quad (2)$$

$$f < R/60*N*C \quad (3)$$

in which, f is the on/off frequency of at least one of the plurality of light sources 130, R is the received rotational speed of the motor in rpms, N is the number of the plurality of fan blades 20, and C is a constant which can be a natural number in some embodiments. In a certain embodiment, f is determined by the processor 120 to be greater than $R/60*N*C$ but not exceed (100%+a first predetermined percentage)*$R/60*N*C$ in accordance with relation (2) and less than $R/60*N*C$ but no less than (100%−a second predetermined percentage)*$R/60*N*C$ in accordance with relation (3). The first and second predetermined percentage may be equal to 3% in some embodiments.

Figure 5A:

FIG. 5A shows an example based on Relation (2), in which C is 1, N is 9, R is 1470 rpms, and the light sources are turned on/off at a frequency f determined to be 223 Hz, slightly greater than 220.5 (22.5=$R/60*N*C$), in which the user can observe 9 fan blades slowly rotating in a clockwise direction even though all the 9 fan blades rotate at a speed of 1470 rpms.

Figure 5B:
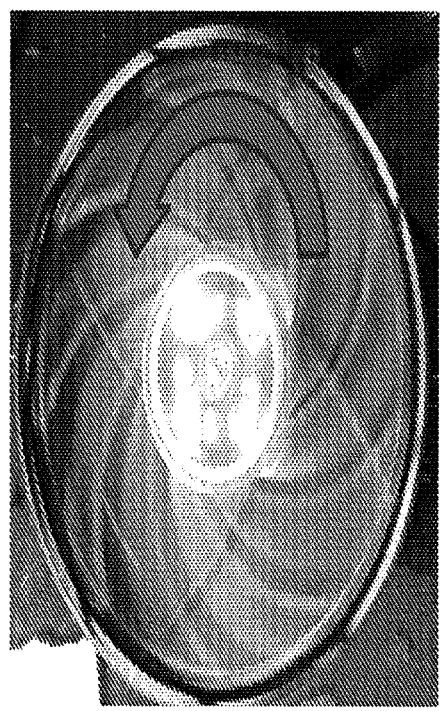

FIG. 5B shows an example based on Relation (3), in which C is 1, N is 9, R is 1470 rpms, and the light sources are turned on/off at a frequency f determined to be 217 Hz, slightly lower than 220.5 Hz (220.5=$R/60*N*C$), in which the user can observe 9 fan blades slowly rotating in an anticlockwise direction even though all the fan blades rotate at a speed of 1470 rpms.

One of ordinary skill in the art would appreciate that two or more of the modes shown in FIGS. 4A-4B can be alternately operated.

Although in the modes shown in FIGS. 4A-5B, the light sources emit light having the same color, in some other embodiments, the light sources having other colors may be activated by control of the processor 120 upon receiving the user's selections or based on a predetermined order.

According to some embodiments, in a case in which the plurality of light sources 130 can include the red, green, and blue color light sources 31, 32, and 33, upon receiving, the user's selections indicating that two or more modes corresponding to those shown in FIGS. 4A-5B are to be simultaneously provided by the fan, from at least one of an input or a receiver which will be described later, during a same time period, the processor 120 turns on/off a group of light sources emitting light having one color selected from red, green, and blue colors at one frequency satisfying equation (1), turns on/off another group of light sources emitting light having another color selected from red, green, and blue colors at another frequency satisfying Relation (2), and turns on/off a third group of light sources emitting light having a third color selected from red, green, and blue colors at a third frequency satisfying Relation (3). In this case, when the user views the fan, the user can simultaneously observe three modes corresponding to those shown in FIGS. 4A, 5A and 5B. For instance, in a case in which N is 9 and R is 1470 rpms, the one color is red and the one frequency is 220.5 Hz, the another color is green and the another frequency is 223 Hz, and the third color is blue and the third frequency is 217 Hz, the user can simultaneously observe 9 static red fan blades, 9 green fan blades slowly rotating in an clockwise direction, 9 blue fan blades slowly rotating in an anticlockwise direction while the fan blades are rotating at 1470 rpms in real time.

On the other hand, according to some other embodiments, during a same time period, the processor 120 turns on/off the plurality of light sources 130 emitting light having colors selected from red, green, and blue at different frequencies satisfying one of Relation (2) and Relation (3). In this case, the user can simultaneously observe three modes corresponding to that shown in either FIG. 5A or FIG. 5B but at different observable rotational speeds. For instance, in a case in which N is 9 and R is 1470 rpms, the light sources emitting red light are controlled to be turned on/off at a frequency of 202 Hz, the light sources emitting green light are controlled to be turned on/off at a frequency of 204 Hz, the light sources emitting blue light are controlled to be turned on/off at a frequency of 206 Hz, the user can simultaneously observe 9 red, green, and blue fan blades slowly rotating in an anticlockwise direction at different observable rotational speeds while the fan blades are rotating at 1470 rpms in real time. In this case, the observable rotational speed of the red fan blades is the fastest one and the observable rotational speed of the blue fan blades is the slowest one of the three observable rotational speeds.

In some embodiments, in a case the plurality of light sources 130 include light sources emitting light having different colors, the plurality of fan blades 20 can display additional colors by color mixing. For example, the light sources emitting red and green light are synchronously turned on/off according to one of the aforementioned modes, the user can observe a mode in brown rather than a mode in red or a mode in green. For another example, the light sources emitting red and blue light are synchronously turned on/off according to one of the aforementioned modes, the user can observe a mode in purple rather than a mode in red or a mode in blue.

In various embodiments disclosed herein, the processor 120 shown in FIG. 3 may be coupled to a memory (or other non-transitory machine readable recording medium) (not shown) storing computer-executable instructions, which when executed, cause the processor 120 to perform the functions described above. These include functions described to receive the signal indicative of the rotational speed of the motor 140 from the motor driver 110, to convert the rotational speed of the motor driver 110 from another different unit to rpms, if necessary, to perform the determination of the on/off frequency of at least one of the plurality of light sources 20 based on Equation (1), Relation (2) and Relation (3), and to transmit the signal indicative of the determined on/off frequency to the at least one of the plurality of light sources 20. The memory (not shown in the drawings) accessible to the processor 120, may store the number of the plurality of fan blades 20 and a default (or predetermined) value of C prior to any change made to C.

Referring back to FIG. 3, in some embodiments, the motor driver 110 may be integrated into the processor 120. In this case, the combination of the motor driver 110 and the processor 120 is a single processor 150, although the present disclosure is not limited thereto.

Figure 6:
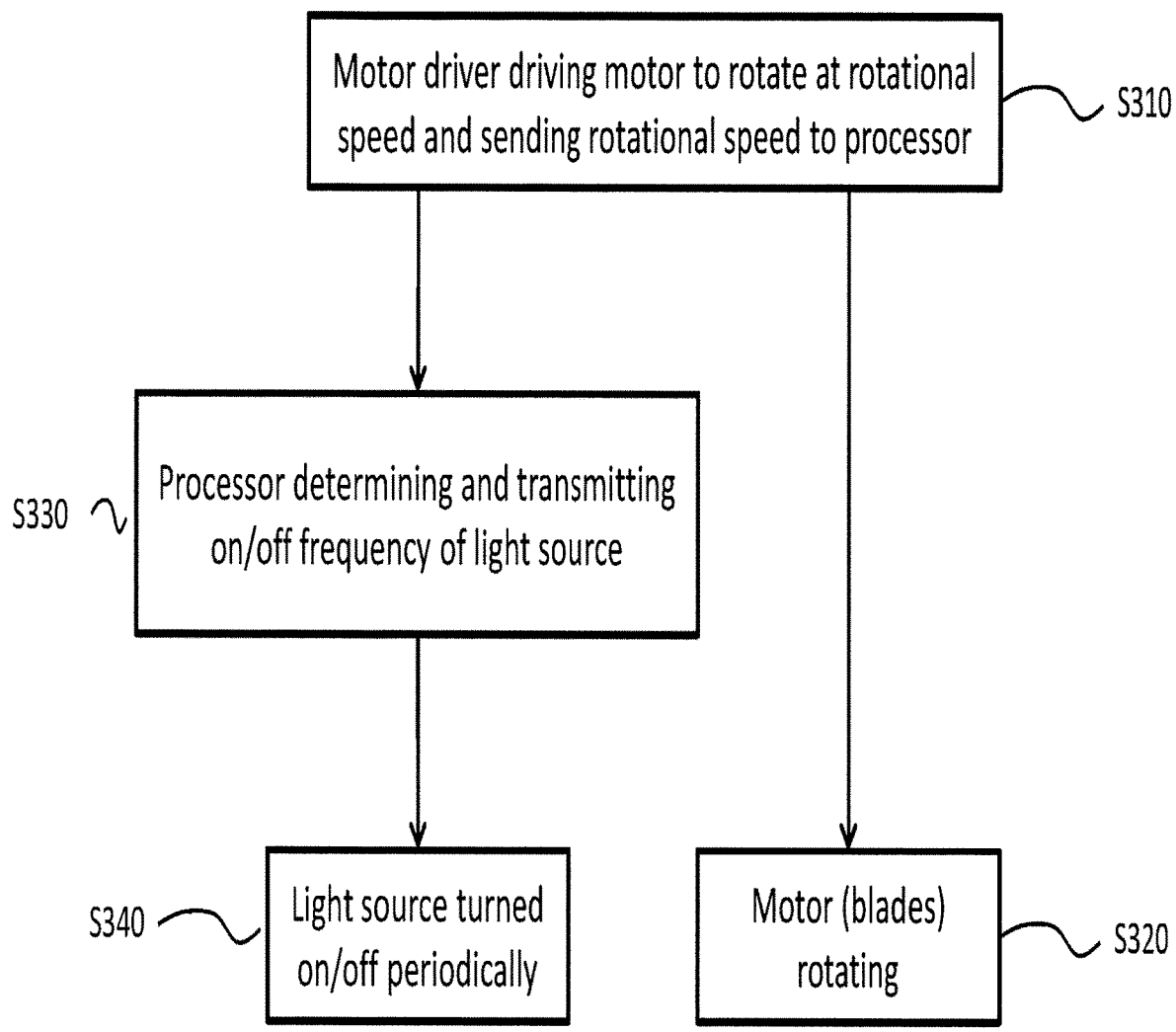
FIG. 6 shows a method of controlling the fan, the schematic circuit diagram of which is shown in FIG. 3.

FIG. 6 shows a method of controlling the fan, the schematic circuit diagram of which is shown in FIG. 3.

Referring to FIGS. 3 and 6, the motor driver 110 drives the motor 140 to rotate at a rotational speed and sends a signal indicative of the rotational speed of the motor 140 to the processor 120 (S310).

The motor 140 rotates at the rotational speed determined by the motor driver 110 (S320). In this case, the plurality of fan blades 20, mechanically coupled to the motor 140, also rotate at the same rotational speed.

Based on the received rotational speed from the motor driver 110, the process determines, for example, based on Equation (1), Relation (2), or Relation (3), an on/off frequency of the at least one of the plurality of light sources 130, and transmits a control signal indicative of the determined frequency to the at least one of the plurality of light sources 130 (S330).

The at least one of the plurality of light sources 130, to which the control signal indicative of the determined frequency is configured to be applied, is turned on/off at the determined frequency in response to a control by the control signal indicative of the determined frequency (S340).

One of ordinary skill in the art would appreciate that although not shown in FIG. 6, more steps similar to S330 and S340 may be periodically performed before or after steps S330 and S340 so as to implement various modes including, but not limited to, those shown in FIGS. 4A-5B with or without color changes. These features have been discussed with reference to FIG. 3 and will be omitted here to avoid redundancy.

Figure 7:
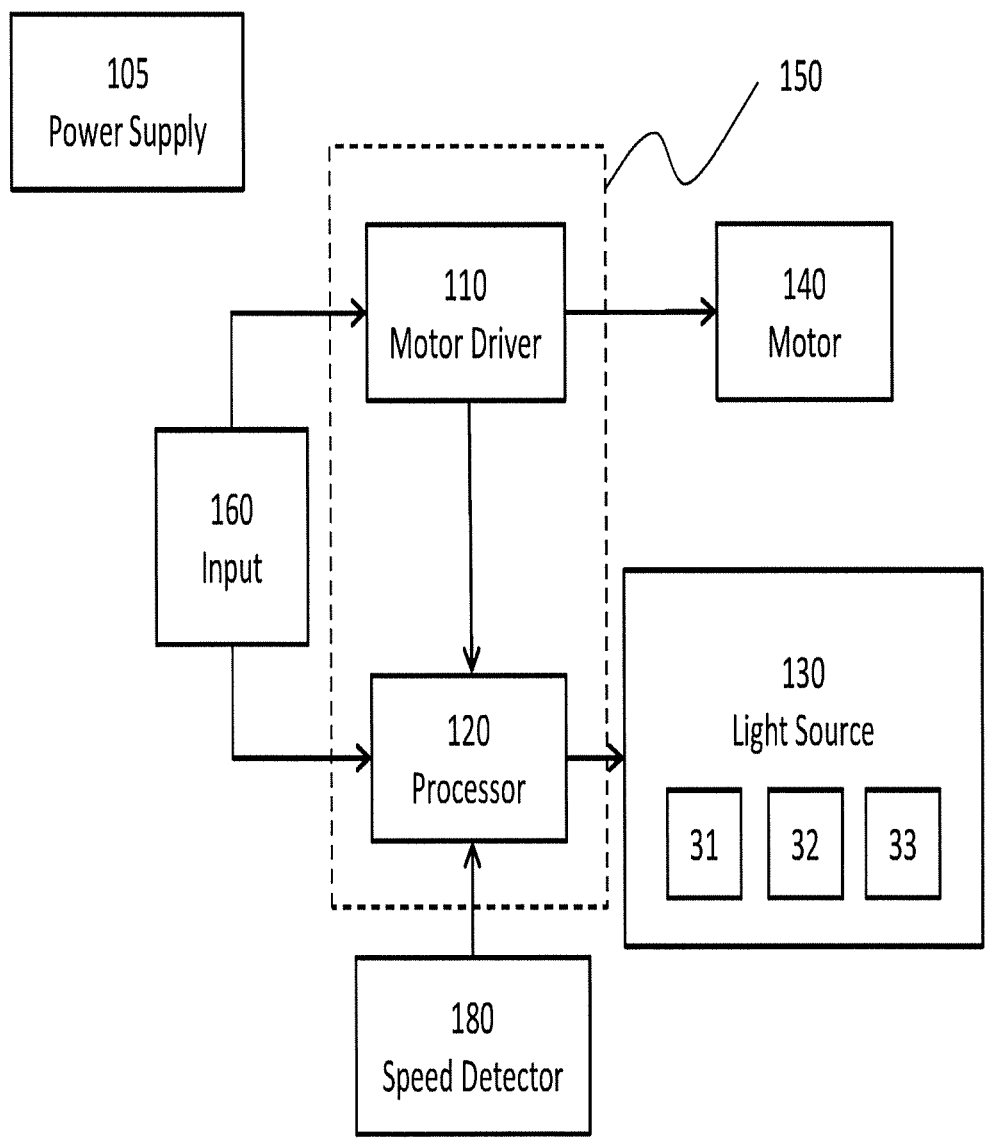
FIG. 7 shows a schematic circuit diagram of a fan according to embodiments of the present disclosure.

FIG. 7 shows a schematic circuit diagram of a fan according to embodiments of the present disclosure.

The schematic circuit diagram shown in FIG. 7 is substantially the same as that shown in FIG. 3, except that an input 160 is added to FIG. 7.

The input 160 may be a user interface including one or more of a touchscreen, a touchpad, a keyboard, a button, and a knob, allowing the user to select a mode of operation, for example, by selecting a value of C indicating the number of fan blades to be visually displayed and selecting a color of the light sources which are associated with the selected value of C. Optionally, the input 160 may receive another input from the user to select a rotational speed of the motor 140.

In some embodiments, the input 160 is configured to allow the user to input various options to enable the fan to alternately work in various modes shown in FIGS. 4A-5B with or without color changes.

The motor driver 110 receives the input from the input 160 to control the rotational speed of the motor 140.

The processor 120 receives, from the input 160, an input indicating the mode of operation including a value of C indicating the number of fan blades to be visually displayed and the color of the light sources which will be turned on/off according to the frequency determined based at least on the value of C. The processor 120 may receive a signal indicative of the rotational speed of the motor 140 from the motor driver 110, or alternatively, may receive a signal indicative of the rotational speed of the motor 140 selected by the user directly from the input 160. Based on the received signals, the processor 120 determines the on/off frequency of the selected light sources and transmits the determined on/off frequency to the respective light sources.

The descriptions of other elements denoted by other reference characters in FIG. 7 will be omitted here to avoid redundancy and may be referred to the descriptions of the elements denoted by the same reference characters in FIG. 3. One of ordinary skill in the art would appreciate that although the input 160 is included in the fan, without any inputs from the user, the fan can operate in a mode with a default value of C set by the manufacturer or the user or operate in the last mode before the fan is turned off.

Figure 8:
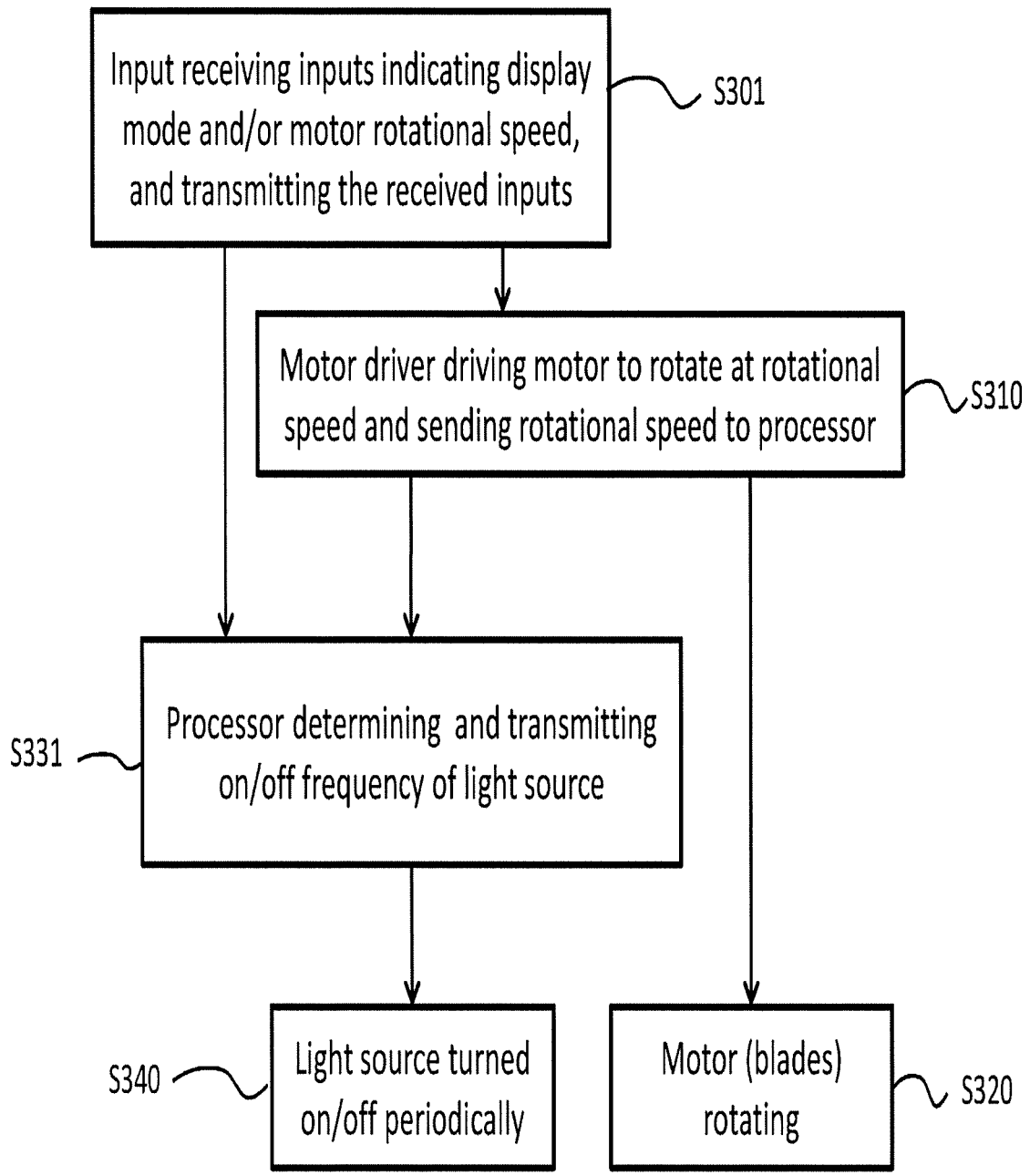
FIG. 8 shows a method of controlling the fan, the schematic circuit diagram of which is shown in FIG. 7.

FIG. 8 shows a method of controlling the fan, the schematic circuit diagram of which is shown in FIG. 7.

As shown in FIG. 8, the input 160 receives an input from the user indicating a mode of operation of the fan and transmits signals indicating the user's input to the processor 120 and the motor driver 110 (S301). Parameters representing the mode of operation include, but are not limited to, at least one of a value of C, a selection of visually static view of fan blades and visually slowly rotating view of fan blades (anticlockwise or clockwise), and a color of the light sources. Optionally, the input 160 may receive another input from the user to select a rotational speed of the motor 140 (S301).

The motor driver 110 receives a signal indicating the rotational speed of the motor 140 set by the user from the input 160 and drives the motor 140 accordingly. The motor driver 110 may transmit a signal indicating the rotational speed of the motor 140 to the processor 120.

The processor 120 receives from the input 160 a signal indicating the mode of operation of the fan set by the user. The processor 120 receives a signal indicating the rotational speed from one of the input 160 and the motor driver 110. Based on the received signals, the processor 120 determines the on/off frequency based on one of Equation (1), Relation (2), and Relation (3), and transmits the determined on/off frequency to the corresponding light sources (S331).

Descriptions of steps 320 and 330 may be referred to the descriptions with reference to FIG. 6 and therefore will be omitted to avoid redundancy.

Figure 9:
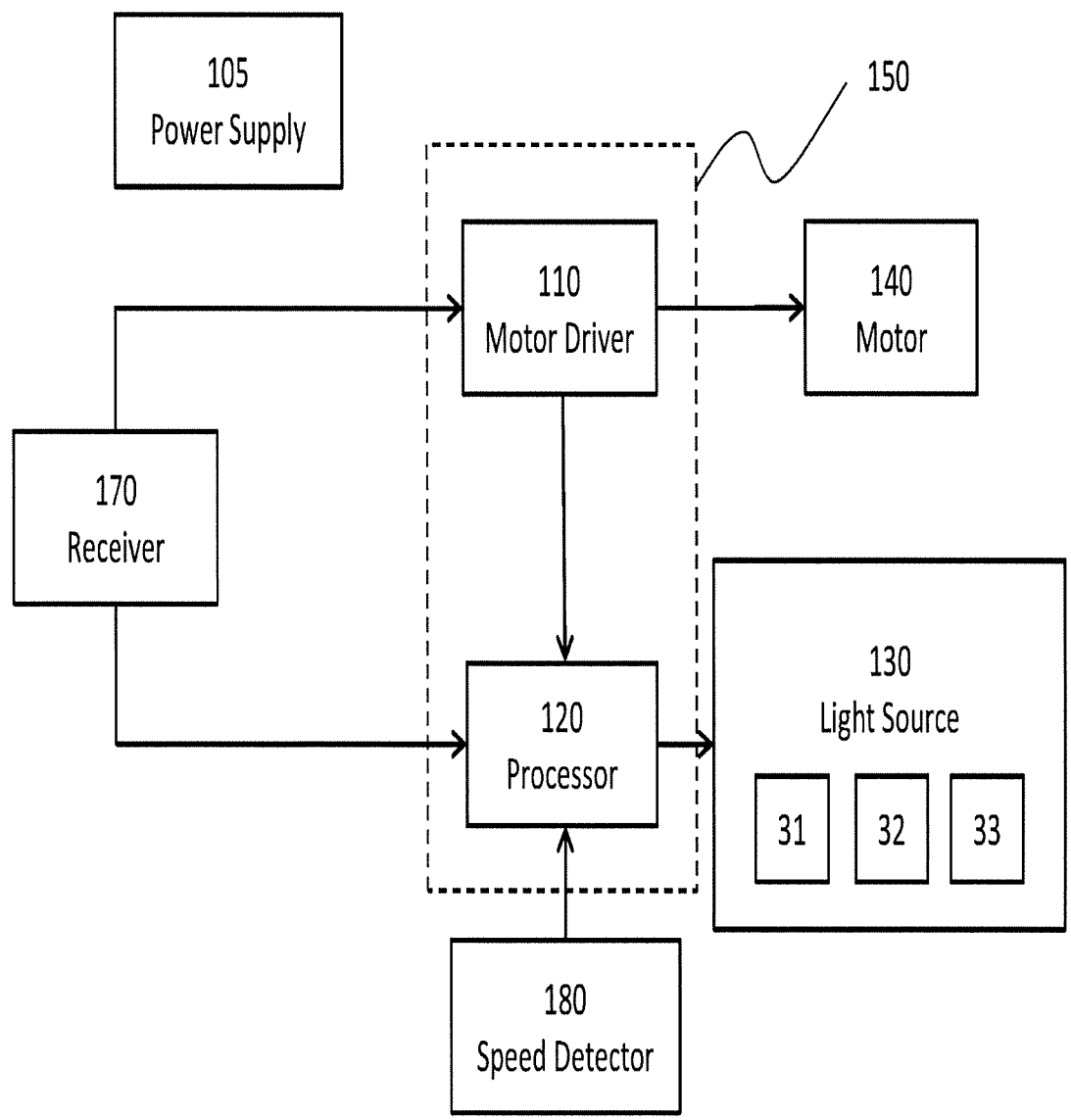
FIG. 9 shows a schematic circuit diagram of a fan according to embodiments of the present disclosure.

FIG. 9 shows a schematic circuit diagram of a fan according to embodiments of the present disclosure.

The schematic circuit diagram shown in FIG. 9 is substantially the same as that shown in FIG. 7, except that the input 160 in FIG. 7 is replaced by a receiver 170. The receiver 170, which may be an infrared receiver or a wireless receiver configured to have a communication chip for receiving a BLUETOOTH signal, a WI-FI signal, and/or a cellular signal, receives a wireless signal indicating a remote input made by the user through, for example, by a remote controller or a smart portable device such as a smart phone. The remote input by the user may be referred to the user input described with reference to FIG. 7 and will not be repeated here.

The motor driver 110 and the processor 120 are configured to receive the corresponding signals from the receiver 170, similar to a case in which the motor driver 110 and the processor 120 are configured to receive the corresponding signals from the input 160 as shown in FIG. 7.

The other descriptions are the same as the descriptions with reference to FIG. 7 and will be omitted here.

Figure 10:
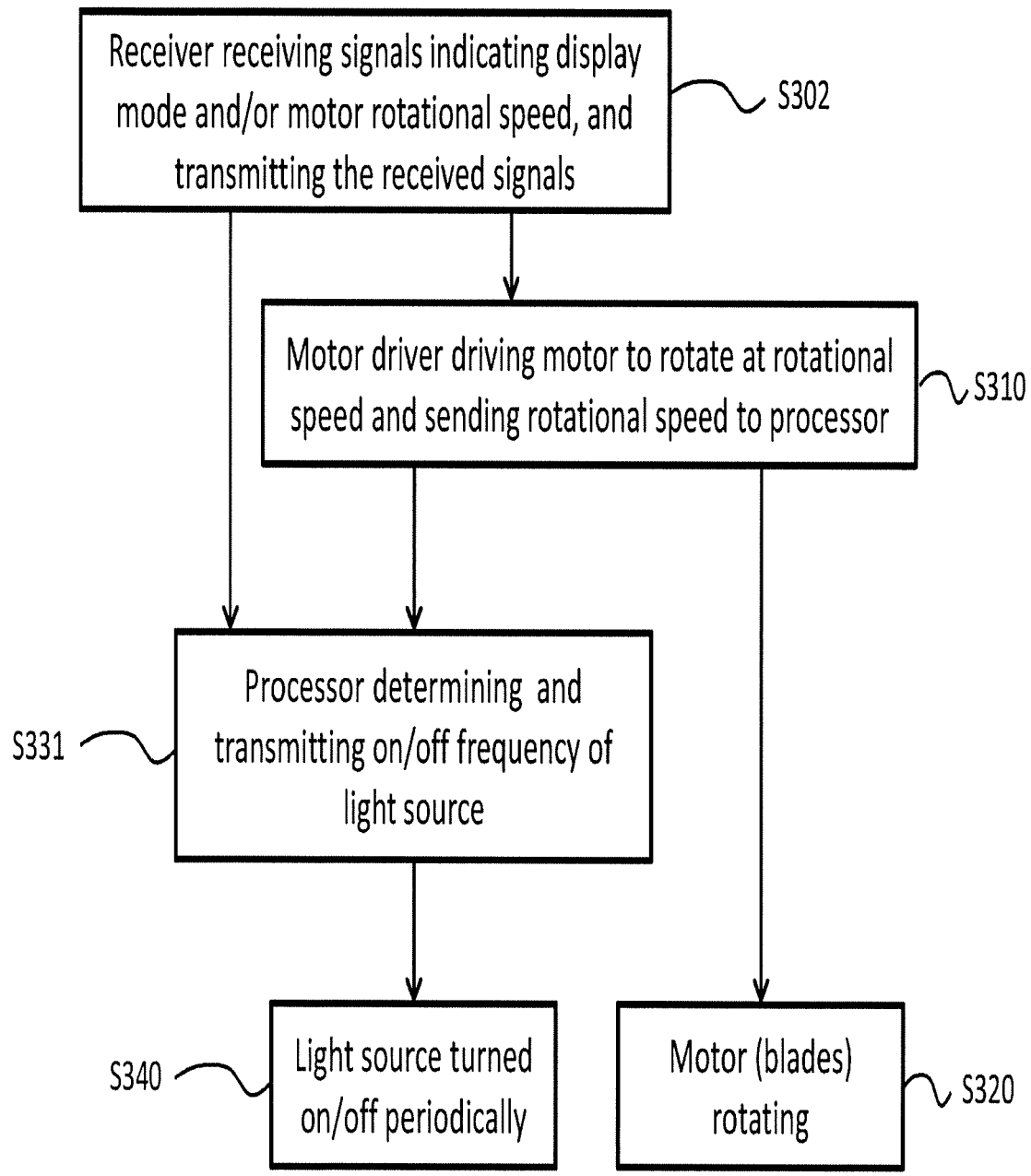
FIG. 10 shows a method of controlling the fan, the schematic circuit diagram of which is shown in FIG. 9.

FIG. 10 shows a method of controlling the fan, the schematic circuit diagram of which is shown in FIG. 9.

The method shown in FIG. 10 is the same as that shown in FIG. 8, except that the receiver 170, rather than the input 160, receives signals indicating the user's selection and transmits the received signals to the processor 120 and the motor driver 110 (see S302). To avoid redundancy, the other descriptions will be omitted.

Figure 11:
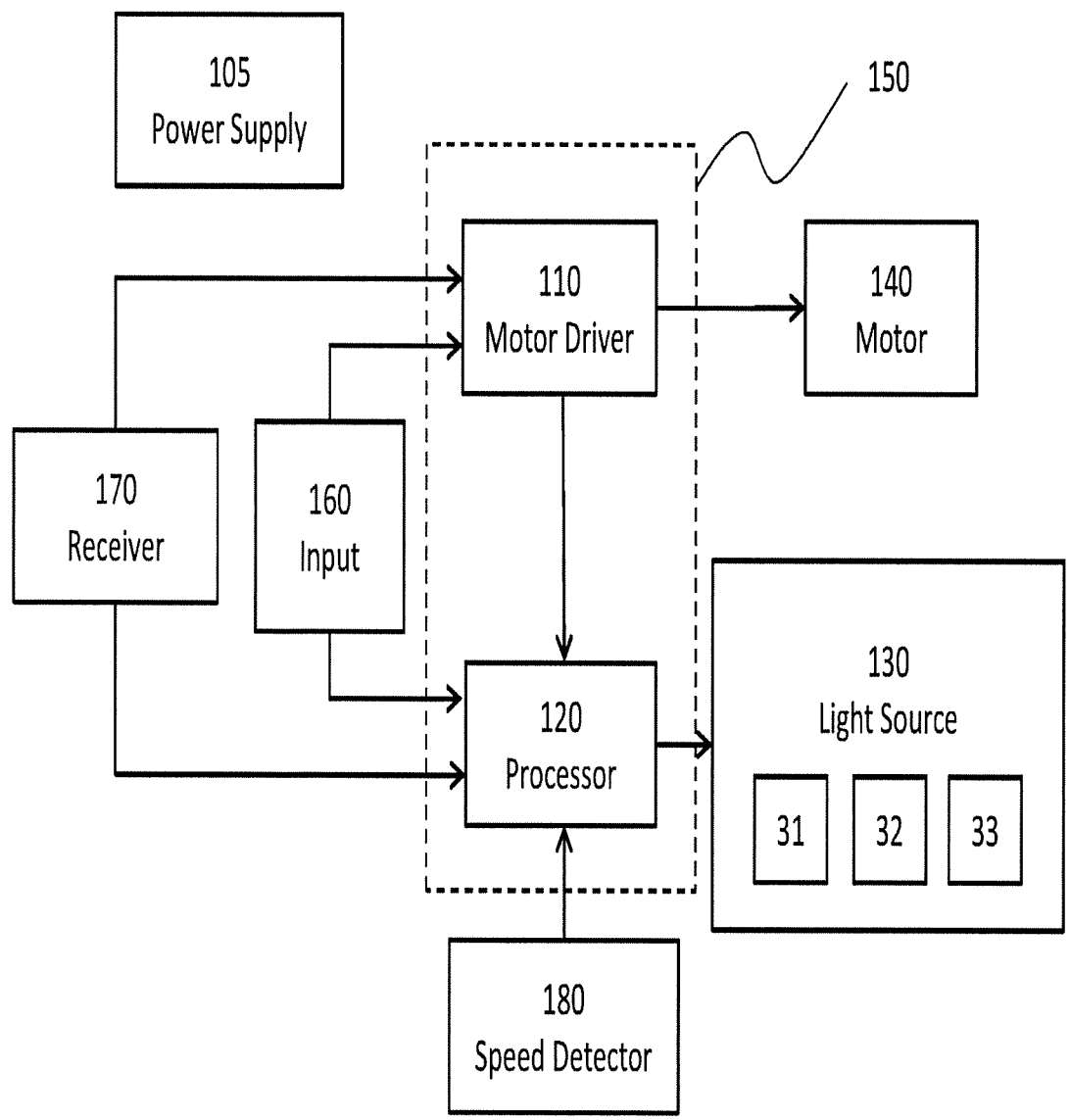
FIG. 11 shows a schematic circuit diagram of a fan according to embodiments of the present disclosure.

FIG. 11 shows a schematic circuit diagram of a fan according to embodiments of the present disclosure.

The schematic circuit diagram shown in FIG. 11 is substantially the same as that shown in FIG. 7 or FIG. 9, except that both the input 160 and the receiver 170 are implemented in the fan. The descriptions of FIG. 11 may be referred to either the descriptions of FIG. 7 or the descriptions of FIG. 9, or both.

Figure 12:
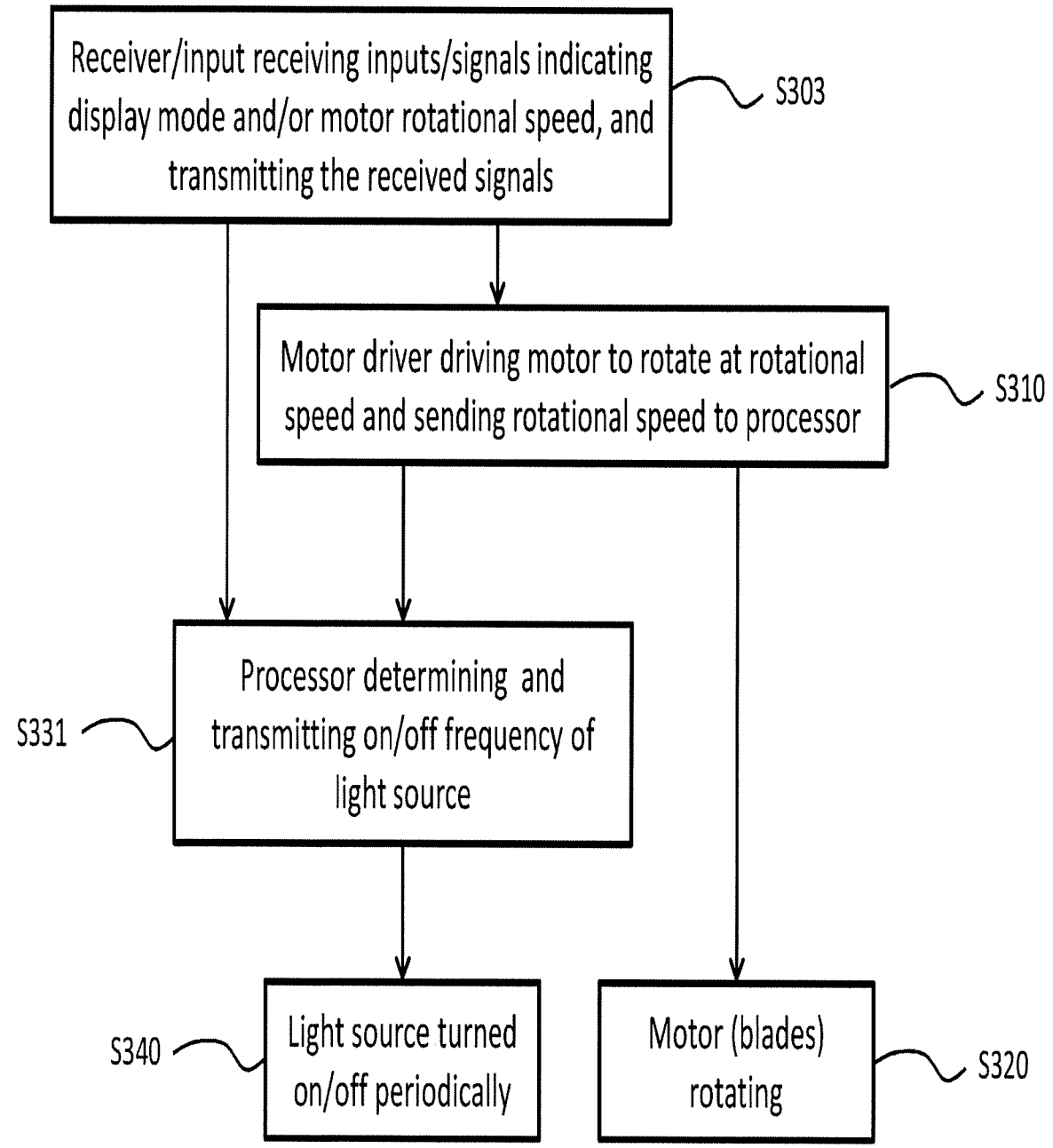
FIG. 12 shows a method of controlling the fan, the schematic circuit diagram of which is shown in FIG. 11.

FIG. 12 shows a method of controlling the fan, the schematic circuit diagram of which is shown in FIG. 11.

The method shown in FIG. 12 is the same as that shown in FIG. 8 or FIG. 10, except that the receiver 170 and/or the input 160 receive signals and/or inputs indicating user's selection and transmit corresponding signals to the processor 120 and the motor driver 110 (S303).

Figure 13:
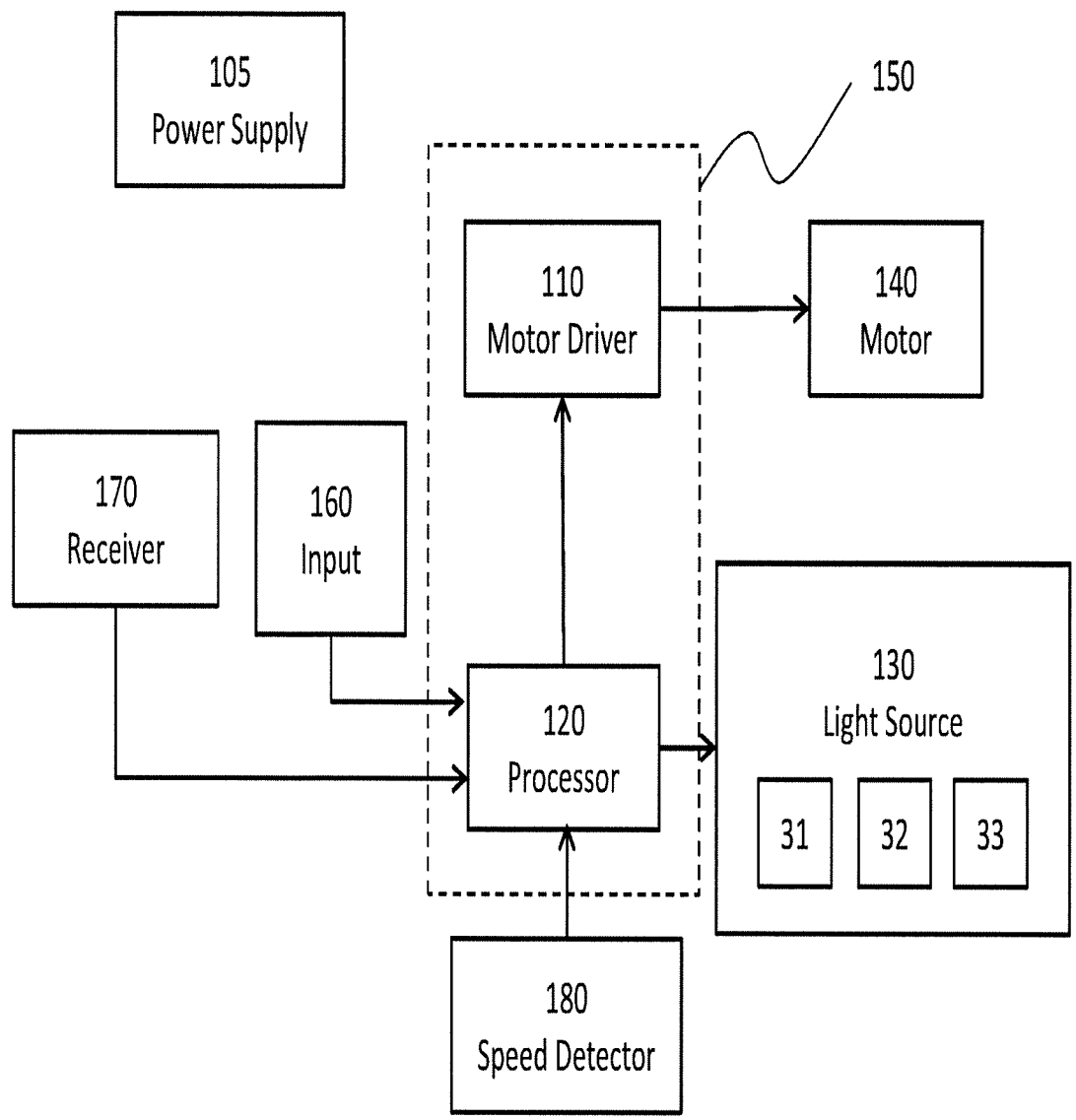
FIG. 13 shows a modified schematic circuit diagram of a fan according to embodiments of the present disclosure, based on the schematic circuit diagram of the fan shown in FIG. 11.

FIG. 13 shows a modified schematic circuit diagram of a fan according to embodiments of the present disclosure, based on the schematic circuit diagram of the fan shown in FIG. 11.

Referring to FIG. 13, at least one of the receiver 170 and the input 110 transmits a signal indicating a rotational speed of the motor 140 to the processor 120, rather than to the motor driver 110 as shown in FIG. 11. In this case, the processor 120 transmits the received signal indicating the rotational speed of the motor 140 to the motor driver 110 to enable the motor driver 110 to drive the motor 110 to rotate according to the received rotational speed. All the other descriptions will be the same as those with reference to FIG. 11. In some embodiments, one of the receiver 170 and the input 110 or both can be omitted.

Figure 14:
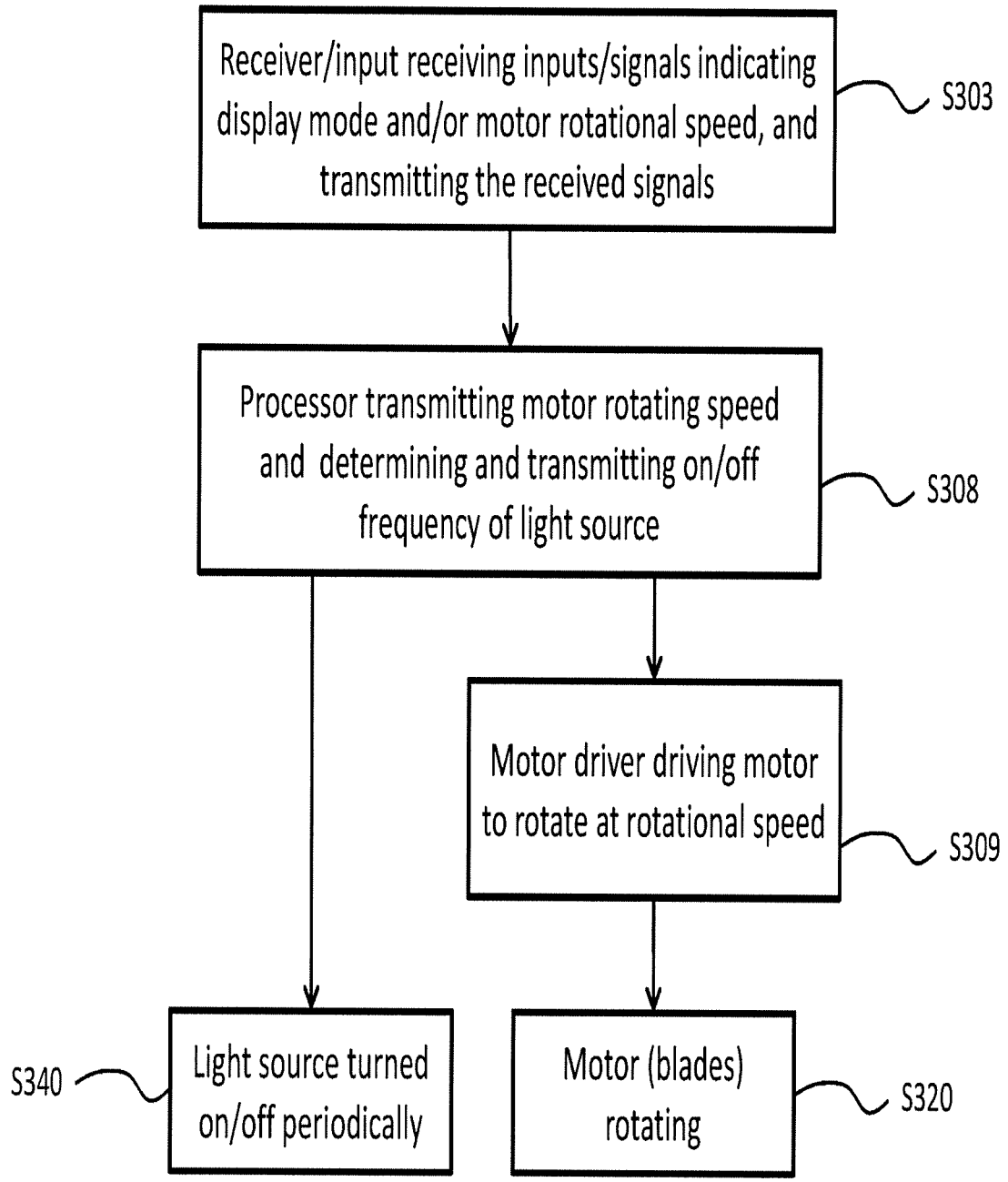
FIG. 14 shows a method of controlling the fan, the schematic circuit diagram of which is shown in FIG. 13.

FIG. 14 shows a method of controlling the fan, the schematic circuit diagram of which is shown in FIG. 13.

The method shown in FIG. 14 is substantially the same as that shown in FIG. 12, except that the processor also receives a signal indicating a rotational speed of the motor 140 and transmits the received signal to the motor driver 110.

The fan according to various embodiments of the present disclosure is able to provide a virtually static view of fan blades or virtually slowly rotating view of fan blades while the fan blades are rotating at a high speed in real time, which may attract and entertain a user so as to provide the user with a relaxed environment.

According to some aspects of the present disclosure, the fan blades are constructed to not circulate air when rotating and in this case, the apparatus having the aforementioned elements can still entertain the user.

While exemplary embodiments have been shown and described above, it will be apparent to those skilled in the art that modifications and variations could be made without departing from the scope of the present disclosure as defined by the appended claims.

What is claimed is:

1. A fan, comprising:
a frame;
a plurality of light sources installed in the frame;
a hub installed in the frame and including an upper plate, a shrouding plate coupled to the upper plate, and a plurality of fan blades coupled to the shrouding plate, wherein the plurality of light sources are arranged in the frame such that light from the plurality of light sources is transmitted to the plurality of fan blades and the light illuminates the plurality of fan blades;
a motor installed in the frame;
a motor driver arranged in the frame and driving the motor to rotate the plurality of fan blades; and
a processor receiving a signal indicative of a rotational speed of the plurality of fan blades from the motor driver and controlling at least one of the plurality of light sources to turn on/off at a first frequency determined at least based on a first relation with respect to the rotational speed of the plurality of fan blades.

2. The fan of claim 1, wherein
the plurality of light sources include a first light source emitting light having a first color, the first light source being turned on/off at the first frequency,
the plurality of light sources include a second light source emitting light having a second color different from the first color, the processor turning on/off the second light source at a second frequency determined at least based on a second relation with respect to the rotational speed of the plurality of fan blades, and
the first frequency is different from the second frequency.

3. The fan of claim 2, wherein a time period during which the first light source emitting light having the first color is turned on/off at the first frequency and a time period during which the second light source emitting light having the second color is turned on/off at the second frequency do not overlap each other.

4. The fan of claim 2, wherein, in a same time period, the first light source emitting light having the first color is turned on/off at the first frequency and the second light source emitting light having the second color is turned on/off at the second frequency.

5. The fan of claim 2, wherein the first relation is given by $$f_1 > \frac{R}{60} * N * C$$

and the second relation is given by $$f_2 < \frac{R}{60} * N * C$$

wherein $f_1$ is the first frequency, $f_2$ is the second frequency, R is the rotational speed in revolutions per minute, N is number of the plurality of fan blades, and C is a natural number.

6. The fan of claim 2, wherein the processor is configured to receive a rotational speed of the motor from the motor driver and receive an external input, and
wherein the processor is configured to adjust the first frequency and the second frequency based on one or more of the external input and the rotational speed.

7. The fan of claim 2, further comprising a receiver communicably coupled to the processor,
wherein the processor is configured to receive a rotational speed of the motor from the motor driver and to adjust the first frequency and the second frequency based on at least one of the rotational speed and a signal received by the receiver.

8. The fan of claim 2, further comprising:
a signal receiver communicably coupled to the processor; and
a user interface communicably coupled to the processor,
wherein the processor is configured to receive a rotational speed of the motor from the motor driver and to adjust the first frequency and the second frequency based on at least one of a user input received from the user interface and a signal received by the signal receiver.

9. The fan of claim 2, further comprising:
a receiver communicably coupled to the processor; and
a user interface communicably coupled to the processor,
wherein the processor is configured to receive a signal indicating a rotational speed of the motor via at least one of the receiver and user interface, and to transmit the signal to the motor driver, the motor driver driving the motor to rotate at the rotational speed.

10. A method of controlling a fan, the method comprising:
providing a hub installed in a frame and including an upper plate, a shrouding plate coupled to the upper plate, and a plurality of fan blades coupled to the shrouding plate;
arranging a plurality of light sources in the frame such that light from the plurality of light sources is transmitted to the plurality of fan blades and the light illuminates the plurality of fan blades;
driving a motor to rotate the plurality of fan blades using a motor driver, the motor and the motor driver being arranged in the frame
receiving, using a processor, a signal indicative of a rotational speed of the plurality of fan blades from the motor driver; and
controlling, using the processor, at least one of the plurality of light sources to turn on/off at a first frequency determined at least based on a first relation with respect to the rotational speed of the plurality of fan blades.

11. The method of claim 10, wherein the plurality of light sources include a first light source emitting light having a first color and being turned on/off at the first frequency, the method further comprising:
controlling, using the processor, a second light source of the plurality of light sources to turn on/off at a second frequency determined at least based on a second relation with respect to the rotational speed of the plurality of fan blades,
wherein the second light source emits light having a second color different from the first color, and
the first frequency is different from the second frequency.

12. The method of claim 11, further comprising:
controlling, using the processor, the first light source and the second light source such that a time period during which the first light source emitting light having the first color is turned on/off at the first frequency and a time period during which the second light source emitting light having the second color is turned on/off at the second frequency do not overlap each other.

13. The method of claim 11, further comprising:
controlling, using the processor, the first light source and the second light source such that, in a same time period, the first light source emitting light having the first color is turned on/off at the first frequency and the second light source emitting light having the second color is turned on/off at the second frequency.

14. The method of claim 11, wherein the first relation is given by $$f_1 > \frac{R}{60} * N * C$$

and the second relation is given by $$f_2 < \frac{R}{60} * N * C$$

wherein $f_1$ is the first frequency, $f_2$ is the second frequency, R is the rotational speed in revolutions per minute, N is number of the plurality of fan blades, and C is a natural number.

15. The method of claim 11, further comprising:
receiving, using the processor, an external input and a rotational speed of the motor from the motor driver; and
adjusting, using the processor, the first frequency and the second frequency based on one or more of the external input and the rotational speed.

16. The method of claim 11, further comprising:
receiving, using the processor, a signal from a receiver communicably coupled to the processor;
receiving, using the processor, a rotational speed of the motor from the motor driver; and
adjusting, using the processor, the first frequency and the second frequency based on at least one of the rotational speed and the signal.

17. The method of claim 11, further comprising:
receiving, using the processor, a signal from a receiver communicably coupled to the processor;
receiving, using the processor, a user input from a user interface communicably coupled to the processor; and
adjusting, using the processor, the first frequency and the second frequency based on at least one of the user input and the signal.

18. The method of claim 11, further comprising:
receiving, using the processor, a signal indicating a rotational speed of the motor via at least one of a receiver communicably coupled to the processor and a user interface communicably coupled to the processor;
transmitting the signal to the motor driver; and
driving the motor to rotate at the rotational speed using the motor driver.

* * * * *